US011206196B2

(12) United States Patent
Mathur et al.

(10) Patent No.: US 11,206,196 B2
(45) Date of Patent: Dec. 21, 2021

(54) COMPUTER NETWORK TROUBLESHOOTING

(71) Applicant: Palantir Technologies Inc., Palo Alto, CA (US)

(72) Inventors: Arjun Mathur, Stanwood, WA (US); Andrew Ash, San Carlos, CA (US); Anuraag Bahl, New York, NY (US); Andy Chen, New York, NY (US); Aydin Keskin, Jersey City, NJ (US); Christopher Rogers, Brooklyn, NY (US); Anshuman Prasad, New York, NY (US); Ankit Shankar, Redwood City, CA (US); Casey Patton, London (GB); Christopher Wynnyk, Washington, DC (US); Joanna Peller, London (GB); Jonathan Victor, New York, NY (US); Mackenzie Bohannon, San Rafael, CA (US); Mitchell Skiles, New York, NY (US); Nikhil Taneja, New York, NY (US); Ryan Norris, London (GB); Scott Adams, London (GB); Samuel Sinensky, New York, NY (US); Sri Krishna Vempati, Santa Clara, CA (US); Thomas Mathew, New York, NY (US); Vinoo Ganesh, New York, NY (US); Rahij Ramsharan, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/895,621

(22) Filed: Jun. 8, 2020

(65) Prior Publication Data
US 2020/0336394 A1     Oct. 22, 2020

Related U.S. Application Data

(63) Continuation of application No. 15/916,073, filed on Mar. 8, 2018, now Pat. No. 10,721,142.

(51) Int. Cl.
G06F 15/173      (2006.01)
H04L 12/24       (2006.01)
(Continued)

(52) U.S. Cl.
CPC ........ H04L 41/5074 (2013.01); G06K 9/6282 (2013.01); H04L 41/0609 (2013.01); H04L 41/5022 (2013.01); H04L 41/5067 (2013.01)

(58) Field of Classification Search
CPC ............. H04L 41/5074; H04L 41/0609; H04L 41/5022; H04L 41/5067; G06K 9/6282
(Continued)

(56) References Cited

U.S. PATENT DOCUMENTS 9,237,339 B1 * 1/2016 Bordner-Babayigit ...................... H04N 21/4781
9,253,054 B2 * 2/2016 Maturana ........... G05B 23/0264
(Continued)

Primary Examiner — Melvin H Pollack
(74) Attorney, Agent, or Firm — Knobbe Martens Olson & Bear LLP

(57) ABSTRACT

A system for troubleshooting network problems is disclosed. A model can use demographic information, network usage information, and network membership information to determine an importance of a problem. The importance of the problem for the user who reported the problem, a number of other users affected by the problem, and the importance of the problem to the other users can be used to determine a priority for resolving the problem. Before and after a work order is executed to resolve the problem, network metrics can be gathered, including aggregate network metrics, and automatically presented in various user interfaces. The analysis of the metrics can be used to update a database of (Continued)

which work orders are assigned in response to which problems.

20 Claims, 10 Drawing Sheets

(51) Int. Cl.
    *G06K 9/62*     (2006.01)
    *G06F 15/16*     (2006.01)

(58) Field of Classification Search
    USPC .......................................................... 709/223
    See application file for complete search history.

(56) References Cited

U.S. PATENT DOCUMENTS

| | | | |
|---|---|---|---|
| 9,356,829 B1 * | 5/2016 | Zeldin | H04L 41/0659 |
| 9,479,341 B2 * | 10/2016 | Bugenhagen | H04L 45/28 |
| 9,483,338 B2 * | 11/2016 | Bhalla | G06N 5/04 |
| 9,483,791 B2 * | 11/2016 | Schank | G06Q 30/0631 |
| 9,485,312 B2 * | 11/2016 | Gniffke | G06Q 10/06 |
| 9,519,795 B2 * | 12/2016 | Guarrieri | G06F 16/278 |
| 9,569,330 B2 * | 2/2017 | Suit | G06F 11/3006 |
| 9,647,891 B2 * | 5/2017 | Croy | H04L 41/085 |
| 9,898,393 B2 * | 2/2018 | Moorthi | G06F 11/368 |
| 9,917,763 B2 * | 3/2018 | Fallon | H04L 41/5032 |
| 10,142,195 B1 * | 11/2018 | Sledz | G06F 16/182 |
| 10,142,204 B2 * | 11/2018 | Nickolov | H04L 41/0869 |
| 10,148,531 B1 * | 12/2018 | Sledz | H04L 41/0893 |
| 10,361,940 B2 * | 7/2019 | Gupta | H04L 65/80 |
| 10,367,699 B2 * | 7/2019 | Jin | H04B 3/46 |
| 10,375,591 B2 * | 8/2019 | Ketonen | H04L 41/5019 |
| 10,397,819 B2 * | 8/2019 | Bejerano | H04L 1/003 |
| 10,402,768 B2 * | 9/2019 | Zakkam | G06Q 10/0637 |
| 10,574,513 B2 * | 2/2020 | Nagarajan | H04L 43/0805 |
| 10,579,750 B2 * | 3/2020 | McElhinney | G06F 9/50 |
| 10,592,839 B2 * | 3/2020 | Behringer | G06Q 30/0279 |
| 10,721,142 B1 | 7/2020 | Mathur et al. | |
| 10,721,145 B2 * | 7/2020 | Power | H04L 43/062 |
| 10,878,385 B2 * | 12/2020 | Horrell | G06Q 10/067 |
| 2015/0381428 A1 * | 12/2015 | Ong | H04L 49/254 |
| | | | 709/223 |
| 2017/0325120 A1 * | 11/2017 | Szilagyi | H04L 41/5067 |
| 2019/0220760 A1 * | 7/2019 | Kolar | H04L 41/142 |
| 2019/0266506 A1 * | 8/2019 | Feldman | G06F 40/279 |
| 2021/0099336 A1 * | 4/2021 | Li | H04L 43/04 |

* cited by examiner

☆ | ▦ Overview | 🗎 Report          Actions ▾    🔗 Copy link to current view   👥 Share  💬 0

User Experience Prioritisation - Reported Problems
Add a summary for your report User experience on nodes with known issues Previewing 1,000 rows. 8 of 20 columns          Narrow | Medium | Full ⓘ Sort only applies to 1,000 row preview

| | User ID <u>201</u> String | Node/ Hardware ID <u>203</u> String | Importance to User <u>205</u> String | Known Issues <u>207</u> String | Quality Metrics (e.g., Throughput) <u>209</u> String | Aggregate Impact <u>211</u> String | Quality Metric 2 <u>213</u> String | Overall priority Integer <u>215</u> String |
|---|---|---|---|---|---|---|---|---|
| 1 | ABC 123 ⋯ | Router 1 ⋯ | High Importance | Uplink constrained | poor | significant | acceptable | 1 |
| 2 | ABC 456 ⋯ | Router 2 ⋯ | Medium Importance | Uplink constrained | poor | significant | poor | 2 |
| 3 | ABC 789 ⋯ | Router 3 ⋯ | Low Importance | Weather Damage | acceptable | acceptable | poor | 3 |
| 4 | DEF 123 ⋯ | Router 4 ⋯ | High Importance | Download constrained cell | acceptable | significant | poor | 4 |
| 5 | DEF 456 ⋯ | Tower 1 ⋯ | Medium Importance | Download constrained cell | good | acceptable | acceptable | 5 |
| 6 | DEF 789 ⋯ | Tower 2 ⋯ | Low Importance | High packet loss | poor | acceptable | poor | 6 |
| 7 | GHI 123 ⋯ | Tower 3 ⋯ | High Importance | High packet loss | poor | significant | poor | 7 |
| 8 | GHI 456 ⋯ | Tower 4 ⋯ | Medium Importance | High latency | acceptable | acceptable | acceptable | 8 |
| 9 | GHI 789 ⋯ | Repeater 1 ⋯ | Low Importance | Uplink constrained cell | acceptable | acceptable | poor | 9 |
| 10 | JKL 123 ⋯ | Repeater 2 ⋯ | High Importance | Peak time capacity | acceptable | acceptable | poor | 10 |
| 11 | JKL 456 ⋯ | Repeater 3 ⋯ | Medium Importance | Firmware outdated | acceptable | minimum | poor | 11 |
| 12 | JKL 789 ⋯ | Repeater 4 ⋯ | Low Importance | Peak time capacity | good | acceptable | poor | 12 |
| 13 | MNO 123 ⋯ | Server 1 ⋯ | High Importance | Uplink constrained | acceptable | minimum | poor | 13 |
| 14 | MNO 456 ⋯ | Server 2 ⋯ | Medium Importance | High latency | good | minimum | acceptable | 14 |

Add a description

FIG. 2

Work Orders

Sorted by: (select one) — 303

Filter by: Problem Type ▽ — 301
Signal Strength ▽
[Cancel] [Apply]

All work orders

Previewing 1,000 rows. 7 of 13 columns

Narrow | Medium | Full

ⓘ Sort only applies to 1,000 row preview

| | Work order ID 305 | Problem 307 | Solution 309 | Affected Users 311 | Highly Impacted Users 313 | Node/Hardware ID 315 | Overall priority Integer 317 |
|---|---|---|---|---|---|---|---|
| | String | String | String | Long | Long | String | Integer |
| 1 | WO-1 | Signal strength | Adjust power | 21999 | 1042 | Router 1 | 1 |
| 2 | WO-27 | Signal strength | Adjust power | 18245 | 910 | Repeater 1 | 76 |
| 3 | WO-99 | Signal strength | Adjust power | 17368 | 830 | Router 3 | 124 |
| 4 | WO-105 | Signal strength | Adjust power | 14301 | 676 | Tower 4 | 250 |
| 5 | WO-225 | Signal strength | Adjust power | 14894 | 774 | Router 2 | 400 |
| 6 | WO-372 | Signal strength | Adjust power | 13885 | 732 | Router 4 | 652 |
| 7 | WO-501 | Signal strength | Adjust power | 13673 | 750 | Router 1 | 921 |
| 8 | WO-826 | Signal strength | Adjust power | 13453 | 774 | Server 1 | 1236 |
| 9 | WO-1125 | Signal strength | Adjust power | 12946 | 674 | Tower 2 | 1457 |
| 10 | WO-1289 | Signal strength | Adjust power | 12639 | 620 | Tower 3 | 1675 |
| 11 | WO-1458 | Signal strength | Adjust power | 11528 | 740 | Repeater 2 | 1873 |
| 12 | WO-1657 | Signal strength | Adjust power | 11045 | 652 | Repeater 3 | 2165 |
| 13 | WO-1963 | Signal strength | Adjust power | 10635 | 648 | Server 2 | 2458 |
| 14 | WO-2205 | Signal strength | Adjust power | 10443 | 616 | Tower 1 | 2603 |

Add a description

← Back to search

🔧 Work Order /401          /403                    ⧉ Actions ▾
   WO-105
   Individual Impact    Aggregate Impact

| Pre Date | Post Date /405 |
|---|---|
| 1/1/2018 | 1/3/2018 |

☰ Details /407                          📡 Tower4 /409

| Category | Signal Strength | Tower Latitude | 12.34567 |
|---|---|---|---|
| Node ID | Tower 4 | Tower Longitude | 0.1.123456 |
| Power Value | 10  411 | | Map |
| Power Value Date | 1/12/2018 | | |
| Technician | Bob | | |
| Parameter | Watts | | |
| Parameter Type | Power | | |
| Post Daily Average Unique Users | 82 | | |
| Previous Daily Average Unique Users | 254 | | |

☺ Before & After Analysis

Percentage of days with poor experience
☑ Show only for those users whom this tower is primary          Other network quality metrics:

413 ↘
| Call Drops>0 | Mos<3.5 | Throughput<0.5 Mbs | Average CQI | Average Timing Advance |
|---|---|---|---|---|
| ⊘Pre ⊘Post | ⊘Pre ⊘Post | ⊘Pre ⊘Post | ⊘Pre ⊘Post | ⊘Pre ⊘Post |
| 29.082% | 10.788% / 11.778% | 31.793% | 415 → 7.064 / 8.364 | 6.840 / 4.878 |
| 18.315% | | 10.202% | | |

Percentage of days with poor experience
☑ Show only for those users whom this tower is primary          Primary criteria:

417 ↘
| Call Drops>0 | Mos<3.5 | Throughput<0.5 Mbs |
|---|---|---|
| ⊘Pre ⊘Post | ⊘Pre ⊘Post | ⊘Pre ⊘Post |
| 20.999% | 10.750% / 9.883% | 26.535% |
| 15.309% | | 8.254% |

- at least 20% usage through node M-F; OR
- at least 40% usage on weekends; OR
- any usage during lunch hours (11am-1pm)

3 day averages: (Scroll down)

← Back to search

Tower 4 ←—701     ←—703
Overview  Work Orders 16                                                  [ Actions ▾ ]

≡ Properties
| Tower Latitude | 🔍 12.34567 |
|---|---|
| Tower Longitude | 01.123456 |
| IP Address | 192.168.99.99 |
| Detail | Value |
| Active users: | 291 |

← 705

← 709

711

🔗 Links
| Neighbors | > Tower 1 |
|---|---|
| | > Tower 2 |
| | > Tower 3 |
| | > Tower 5 |
| | > Router 26 |
| Document | > Troubleshooting Document ••• |
| Software | > Version 2.6 ••• |
| Work Orders | > 16 Work Orders ••• |

← 707

📊 User Distribution     713

| Important Problems | | User ID | Demographics ☑ | Last Activity ☑ | Data (MB) ☑ | Time (min) ☑ | User HW ☑ | Primary? |
|---|---|---|---|---|---|---|---|---|
| VALUE | COUNT▾ | User 111 | (Data values) | 4 | 207 | 0 | Smartphone | Yes |
| Low | 231 | User 222 | (Data values) | 5 | 180 | 0 | Tablet | Weekdays |
| - | 38 | User 333 | (Data values) | 1 | 241 | 1 | Computer | No |
| Medium | 21 | User 444 | (Data values) | 2 | 262 | 1 | Brand Name | Yes |
| High | 1 | User 555 | (Data values) | 3 | 189 | 0 | Unknown | Weekends |
| | | User 666 | (Data values) | 1 | 29 | 0 | Smartphone | No |
| | | User 777 | (Data values) | 0 | 35 | 0 | Tablet | Yes |
| | | User 888 | (Data values) | 1 | 12 | 0 | Computer | Lunch |
| | | User 000 | (Data values) | 0 | 242 | 4 | Brand Name | Night |

FIG. 7

COMPUTER NETWORK TROUBLESHOOTING

CROSS-REFERENCE TO RELATED APPLICATIONS

This application is a continuation of U.S. patent application Ser. No. 15/916,073, filed Mar. 8, 2018, and titled "COMPUTER NETWORK TROUBLESHOOTING." The entire disclosure of each of the above items is hereby made part of this specification as if set forth fully herein and incorporated by reference for all purposes, for all that it contains.

TECHNOLOGICAL FIELD

This disclosure relates to troubleshooting networks, such as computer networks, wireless networks, communication networks, and the like.

BACKGROUND

Various types of computer networks are deployed to provide communications to large groups of users. The network can include hundreds, thousands, millions, or billions of physical computer devices distributed across large geographic areas, such as buildings, campuses, cities, states, countries, or even the world. Users may encounter and report problems to network technical support personnel ("technicians").

Support teams for networks can sometimes be overwhelmed with user reports about problems and frequently lack the manpower to respond to all reports in a timely manner. The technicians may sometimes attempt to fix reported problems in the order that the reports are received under a first-in-first-out (FIFO) scheme or prioritize fixing problems reported by the largest number of users.

The technicians may attempt to respond to each user report by changing a hardware configuration or changing a software configuration of a computer device in the network to fix the problem reported by the user. The technicians may implement a "fix" according to a protocol and confirm that the user's reported problem is resolved.

SUMMARY

One aspect features a computer system for improving a quality of a communications network, the computer system comprising: a database indicating associations of problem types and work orders; one or more computer readable storage devices configured to store one or more software modules including computer executable instructions; and one or more hardware computer processors in communication with the one or more computer readable storage devices and configured to execute the computer executable instructions in order to cause the computer system to: receive a reported problem about a connection to a network from a first user of a first computer device; collect connection quality metrics for a network connection between the first computer device and a node in the network; reference the database to determine a first work order for the node based at least in part on the connection quality metrics and the reported problem; determine a number of other users who have devices with network connections to the node in the network; assign a first priority score to the first work order based at least in part on the number of other users; assign a second priority score to a second work order; and cause the first work order and the second work order to be executed based at least in part on the first priority score and the second priority score.

The computer system can also have one, any combination of, or all of the following features: the computer executable instructions are further configured to cause the computer system to train a model to generate an importance score for aspects of users' network connections based on at least demographics data for users of the network and network usage data for the users of the network; the computer executable instructions are further configured to cause the computer system to: use the model to determine an importance score for the reported problem to the first user and assign the first priority score to the first work order based at least in part on the importance score; the computer executable instructions are further configured to cause the computer system to use the model to determine a plurality of importance scores for the reported problem to the other users and assign the first priority score to the first work order based at least in part on the plurality of importance scores; the model is a random forest model configured to assign a higher importance score when input factors are similar to historical variables correlated with network quality; the model is trained to generate the importance score further based at least in part on network membership data; the computer executable instructions are further configured to cause the computer system to: collect first performance metrics for the node before the first work order is executed, collect second performance metrics for the node after the first work order is executed, and transmit a report for the node providing a comparison of performance metrics before and after the first work order is executed, wherein the comparison of performance metrics is based at least in part on the first performance metric and the second performance metric; the computer executable instructions are further configured to cause the computer system to: collect first performance metrics for a second node before the first work order is executed, wherein the second node is a neighboring node to the first node, collect first performance metrics for a second node after the first work order is executed, and transmit a report for the second node including a comparison of performance metrics before and after the first work order is executed, wherein the comparison of performance metrics is based at least in part on the first performance metric and the second performance metric; the first work order does not include troubleshooting the second node; the computer executable instructions are further configured to cause the computer system to: change the first work order that is assigned in response to the connection quality metrics and the reported problem.

Another aspect features a method for troubleshooting networks, the method comprising: storing, in a database, associations between problem types and work orders; receiving a reported problem about a connection to a network from a first user of a first computer device; collecting connection quality metrics for a network connection between the first computer device and a node in the network; referencing the database to determine a first work order for the node based at least in part on the connection quality metrics and the reported problem; determining a number of other users who have devices with network connections to the node in the network; assigning a first priority score to the first work order based at least in part on the number of other users; assigning a second priority score to a second work order; and causing the first work order to be executed before the second work order based at least in part on the first priority score and the second priority score.

The method can also include one, any combination of, or all of the following: training a model to generate an importance score for aspects of users' network connections based on at least demographics data for users of the network and network usage data for the users of the network; using the model to determine an importance score for the reported problem to the first user, and assigning the first priority score to the first work order based at least in part on the importance score; using the model to determine a plurality of importance scores for the reported problem to the other users; and assigning the first priority score to the first work order based at least in part on the plurality of importance scores; the model is a random forest model configured to assign a higher importance score when input factors are similar to historical variables correlated with network quality; the model is trained to generate the importance score further based at least in part on network membership data; collecting first performance metrics for the node before the first work order is executed, collecting second performance metrics for the node after the first work order is executed, and transmitting a report for the node providing a comparison of performance metrics before and after the first work order is executed, wherein the comparison of performance metrics is based at least in part on the first performance metric and the second performance metric; collecting first performance metrics for a second node before the first work order is executed, wherein the second node is a neighboring node to the first node, collecting first performance metrics for a second node after the first work order is executed, and transmitting a report for the second node including a comparison of performance metrics before and after the first work order is executed, wherein the comparison of performance metrics is based at least in part on the first performance metric and the second performance metric; the first work order does not include troubleshooting the second node; changing the first work order that is assigned in response to the connection quality metrics and the reported problem.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations like charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; technicians do not know what data to look at), and various embodiments of the disclosure provide significant improvements over such technology. As another example, the solutions described herein can improve network troubleshooting technology. Additionally, various embodiments of the present disclosure are inextricably tied to computer network technology. Such features and others are intimately tied to, and enabled by, computer networks and would not exist except for computer technology. For example, the interactions with computer networks, the types of troubleshooting performed on computer networks, the metrics for computer networks, etc. described below in reference to various embodiments cannot reasonably be performed by humans alone, without the computer networks upon which they are implemented. Further, the implementation of the various embodiments of the present disclosure via computer technology enables many of the advantages described herein, including more efficient interaction with, and presentation of, various types of electronic data.

For purposes of summarizing the disclosure, certain aspects, advantages, and novel features of the innovations have been described herein. It is to be understood that not necessarily all such advantages can be achieved in accordance with any particular embodiment. Thus, the innovations described herein can be embodied or carried out in a manner that achieves or optimizes one advantage or group of advantages as taught herein without necessarily achieving other advantages as can be taught or suggested herein.

BRIEF DESCRIPTION OF THE DRAWINGS

FIG. 2 shows an example user interface for viewing the information about network problems and priorities for resolving the problems.

FIG. 3 shows an example user interface for viewing priorities of work orders.

FIG. 4 shows an example analysis user interface for a work order.

FIG. 7 shows an example user interface presenting details about a network node.

DETAILED DESCRIPTION

Figure 1:
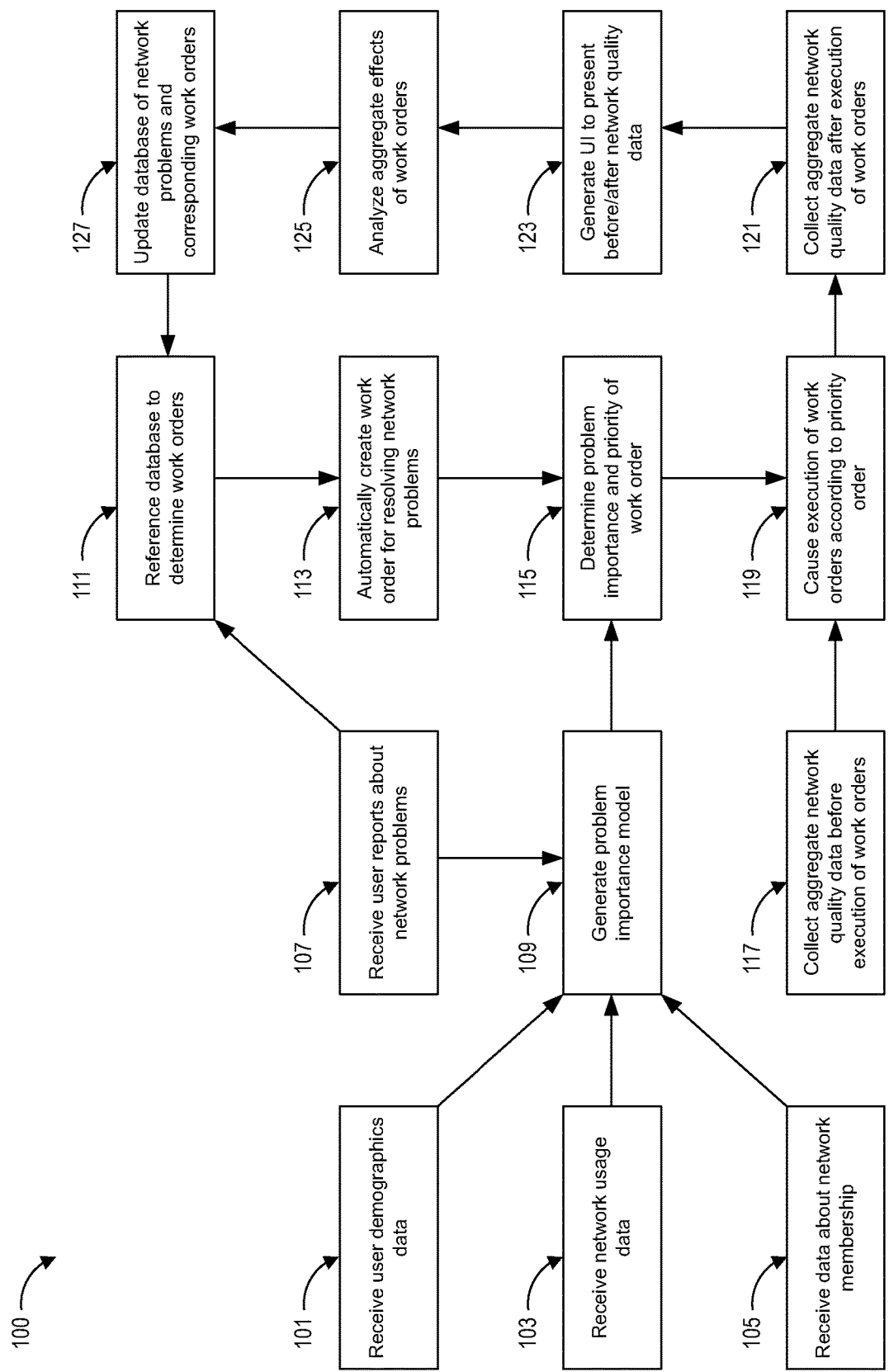
FIG. 1 shows an example flowchart for troubleshooting network problems.

The following detailed description presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Node: A part of a system or device that is interconnected with other nodes and contributes to the functionality of the system. Examples of network nodes include routers, wireless access points, switches, servers, repeaters, firewalls, etc.

Introduction

Technicians may fail to understand the complexities and interrelationships of all of the computer devices in a network. When technicians attempt to respond to a user report by changing a hardware configuration or software configuration of a computer device to fix one user's problem, the technician often unknowingly introduces side effects that cause problems for other users. After responding to a reported problem, the technician may often check with the user to see if the reported problem is fixed. This checkup may deceive the technician into believing that the overall network quality is improved thanks to his/her own efforts, when in actuality, the technician may have caused side effects that lowered the overall network quality for other users.

As an example, a first user may report a poor connection to a wireless network. A first technician may change hardware or software configurations of a nearby network node, such as a router, wireless access point, server, cell tower, etc., to adjust a setting such as a frequency channel, antenna angle, port number, power threshold, etc., until the first user's connection is improved. Unbeknownst to the first technician, this change can cause the network connection to degrade for other users. The next day, a second user may report the degraded network connection, and the report may be handled by a second, different technician. The second user may connect through a same or different network node as the first user. The second technician may change a different setting or possibly reverse the first technician's changes and work diligently with the second user until the second user confirms that his/her network connection is restored to the previously satisfactory quality. This "fix" of the second user's problem may in turn cause new problems for the first user or for a third group of users. This can create back-and-fourth changes or a perpetual chain of changes that do not improve the overall network quality, and the technicians may not even be aware of the problem.

Often, the technicians refer to troubleshooting manuals to execute the prescribed "fixes" for known problems. For some networks, engineers (who are similarly unable to understand all of the complexities and interrelationships of all of the computer devices in a network) may write troubleshooting manuals. The engineers may be even further removed from knowledge of the side effects than the technicians. In any event, the troubleshooting manual remains static and unchanged after each fix such that the same solution is implemented whenever the same problem is reported, and the same side effects continue to be unknowingly created.

Even if a technician knows about the possible side effects, the technician may not even know what to look for to diagnose, prevent, or resolve the side effects due without creating further side effects due to the limited abilities of people to understand the overwhelmingly complex interrelationships of all of the computer devices in a network. Accordingly, there remains room for improving the ability to understanding the effects of modifying network hardware and software such that the troubleshooting process can be improved to fix network problems without creating new problems, thereby improving the overall network quality.

When support teams lack the manpower to respond to all reports in a timely manner, responding to user reports according to a FIFO queue can cause the most important problems that affect the largest number of users to be delayed in favor of less important problems that may have been reported earlier. Some systems may escalate certain problems based on the number of users who report a problem. This escalation system may work well for some types of network problems, such as a complete and immediate service outage. However, outside of such situations, the number of user reports can often be a poor indicator of the overall user experience or overall network quality. Many users may report problems that have little impact on the user experience. Other users may be significantly impacted by unreported problems or be among very few users impacted by important problems. In many cases, the importance of problems is not correlated with the number of times that the problem is reported and is also not correlated with how early the problem is reported. Therefore, it can be difficult to determine which problems to fix first when support teams are overwhelmed. Accordingly, there remains room for improving the process for selecting which reported problems to respond to first such that the quality of network communications is improved sooner.

Systems and methods are disclosed herein for evaluating the results of troubleshooting a network in different ways to improve the actual overall network quality (not just perceived the quality perceived by a technician) and for troubleshooting the more important network issues first, even if the issues are not reported sooner and not reported by larger numbers of users. A system can be configured to collect network metrics indicative of network quality. Network metrics can be collected for individual and aggregate network nodes before and after certain types of network "fixes" are performed on the individual node. Based on the metrics, the "fixes" to certain types of reported problems can be adjusted if the "fixes" cause aggregate or individual reductions in network performance. The system can also be configured to generate a model to determine characteristics of problems that are more important to users and to determine how many users are impacted by a problem independently of the number of users who report the problem. The model can be used to prioritize which network problems to resolve first.

FIG. 1 shows an example flowchart 100 for troubleshooting network problems. The flowchart can be used to troubleshoot and fix network problems in a way that resolves more important problems first and continually improves the troubleshooting process to avoid unintended side effects.

At block 101, user demographics can be received and stored in a database. The user demographics can include information about the users of the network, such as the age, sex, locations, background, income, jobs, worldviews, affiliations, etc.

At block 103, network usage data for various users can be received and stored in a database. The user network usage data can include, for example, which devices are used by which users to access a network, what software is used to access a network, which nodes of a network are accessed, the amount of data sent or received by the network, times of network usage, which nodes of the network are interacted with and the corresponding locations of the nodes, signing in or out of a network, number of connections made to a network, etc. The network usage data can also include network metrics, such as connection speeds, signal strength, error rates, dropped packets, communication protocols, other indicia of connection quality, etc.

At block 105, data about network membership can be received. The data about network membership can include, for example, identities of users, identities of the networks, identities of the network service providers, general user account information, when users became a network member, when users terminated a network membership, an allocated data quantity for the user's membership (such as 5 GB per month, 100 GB per month, unlimited data), an allocated speed for the user's membership (such as 4G, 100 Mbps, etc.), consideration and rates for users to participate in the network membership, and the like.

At block 107, user reports about network problems can be received and stored in a database. The user reports can be received over the internet (such as through a website for reporting problems), through texting (such as with support personnel or with an automated chat bot), or through phone calls. In some cases, the user reports are made by telephonic or other voice communications to a technician, who enters the reported network problems into a computer system such that a database is updated to include the reported problem. The reported problems can include an indicator of the user who reported the problem (such as a username, real name, identification number, etc.), as well as a description of the type of problem reported (such as a poor connection, dropped connection, slow connection, static, reception, etc.). The problem can be determined by the technician based on the problem reported by the users. Example problems include network coverage problems, constrained uplinks, overshooting, interference, load balancing, etc. To determine a problem, the technician can examine factors such as call quality metrics, coverage, which nodes the user is connected to, known problems for hardware or software.

At block 109, a model can be generated to determine the importance of problems reported by users and/or determine a priority for resolving the problems. A model can be trained using historical data collected in blocks 101-107 to calculate an importance for each user's reported problem. In some embodiments, the model can be generated using a classification system, machine learning system, regression system, or other model generator. The model can be a random forest model, directed graph model, classification model, artificial intelligence model, or any other type of model.

A decision tree can be used to create a training model to predict an outcome (e.g., whether a user may have a poor user experience) by learning decision rules inferred from prior data (training data). A decision tree algorithm can use tree representation. Each internal tree node of the tree corresponds to an attribute, and each leaf node corresponds to a class label (e.g., a prediction). At the beginning of the decision tree algorithm, the whole training set can be considered as the root. The order of placing attributes as root or internal node of the tree can be done by using some statistical approach. The decision tree algorithm can include: step 1, selecting an attribute of the dataset at the root of the tree; step 2, splitting the training set into subsets, where the subsets can be made in such a way that each subset contains data with the same value for an attribute; and repeat step 1 and step 2 on each subset until the leaf nodes in all the branches of the tree are identified.

The model can be trained to indicate a user experience score indicative the quality of network connections experienced by the users based on the network usage data discussed with respect to block 103. As discussed, the network usage data can include network metrics such as connection speeds, signal strength, error rates, dropped packets, communication protocols, and other indicia of connection quality. In some embodiments, the network metrics can include a MOS (mean opinion score), CQI (call quality index) score, or other quality metric. The user experience can be determined based on any combination of network usage data factors. For example, the user experience score can be higher for users who have a threshold number of connections experience faster connection speeds, experience a higher MOS, experience higher CQI scores, have fewer than a threshold number of dropped calls, and/or fewer than a minimum average signal strength.

The model can be trained to determine an importance score indicating the importance of a problem based at least in part on when members of a network have terminated their membership and/or on the user experience score, and the model can consider if the member reported problems or experienced poor network quality before terminating their network membership. For example, problems that are likely to cause the user experience score can be given higher priority. As another example, when a newly reported problem about a network connection is similar to problems that were previously reported by users who terminated their network memberships, the model can assign a relatively high importance to the newly reported problem. This high importance can be assigned even if very few users call to report the new problem. For example, users may experience dropped calls when traveling through a subway tunnel. Network usage data records may indicate that these dropped call events are not correlated with network membership terminations, and the model can be trained to assign no or low importance to dropped calls in such circumstances. On the other hand, users may occasionally experience dropped calls at work or at home. The network usage data may indicate a correlation between these dropped calls and network membership terminations, and the model can be trained to assign a greater importance to dropped calls at home or at work locations.

The same problems do not affect all users in the same way. For example, slow network speeds at lunchtime may affect some users more than others. Accordingly, the model can be configured to differentiate between different users to by accounting for differences in demographic data. For example, it may be determined that a slow network speed at lunchtime has historically led a first group of users from one geographic region to terminate a network membership, but a second group of users facing similar problems in a different geographic region did not. Accordingly, if a new user reports a slow network speed at lunchtime, then based on the demographic similarity of the new user (e.g., whether the new user is located in the first or second geographic region), the new user's reported problem can be assigned a different importance. The model can be configured or trained to determine which demographic factors are important when different types of problems arise.

The model can be further configured to determine an importance or priority for a reported problem based on the network usage data from block 103. The network usage data can be used by the model in at least two ways.

First, the model can determine a correlation between the quality of network connections (whether as an aggregate score or based on individual metrics such as data transmission speed) and network membership. Then, the model can apply the correlation in determining an importance of a newly reported problem. For example, if a new user reports a problem with a network, but the new user still experiences a quality of network connection that was not historically correlated with membership termination, then the user's problem can be assigned a lower importance or priority score, and vice versa.

Second, whenever a problem is reported by a first user, the model can determine how many other users are similarly affected by the reported problem. For example, if a user calls to report a slow connection, the model can consider how many other users routinely connect to the same network nodes. If a greater number of additional users are likely to be similarly affected (such as due to using the same software, using the same hardware, connecting through the same network nodes, etc.), then the user's reported problem can be assigned a higher priority score, and vice versa. Accordingly, the model can assign a higher priority score to a problem that affects a larger number of network users, even if fewer network users report the problem. In some embodiments, the priority can be based on the importance to the user reporting the problem and a quantity of other affected users. In some embodiments, the priority can additionally or alternatively be based on an importance to the other affected users.

At block 111, a database of problem types can be referenced and strategies to potentially fix those problem types can be identified. For example, a database of network problems and corresponding work orders can be referenced to determine a work order for the problem reported by the user in block 107. For example, the database can include entries indicating one or more troubleshooting steps for each type of problem. For example, the database can include entries that if a first type of problem is reported, then a hardware node should be reset; if a second type of problem is reported, then a communication frequency of a wireless access point should be adjusted; if a third type of problem is reported, then a node should be reset and have an antenna adjusted; and if a fourth type of problem is reported, then a user needs to update software on the user's side. The database of network problems can also include corresponding network connection metrics that affect which work order is selected. For example, if a user calls to complain about a slow connection speed when connecting to a network node, the network usage data from block 103 can be analyzed to determine if just the user's connection is slow, or if the connection is slow for all users. If only the user's connection speed is slow or slow for other users with similar computing devices, then a solution may be implemented to update or service the user's computing device. If the network is slow for a plurality of general users with various computing devices, the network node may be upgraded to improve capacity.

At block 113, a work order for troubleshooting the network can be automatically created in response to receiving the reported problem at block 107. For example, if the first type of problem is reported by a user through a website, then a work order to reset a hardware node can be created.

At block 115, the model from block 109 can be used to determine an importance of the reported network problem and a priority for the work order. Each work order can be assigned a priority score according to the model, and the work orders can be prioritized based on the priority scores. The priority scores can account for an importance of a problem, a number of other users affected by the problem, and/or an importance to the other users. Accordingly, understaffed network support teams can resolve the most impactful problems first to meaningfully improve the network connection quality.

At block 117, aggregate network quality data can be collected before work orders are executed. This can include, for example, which devices are used by users to access a network, what software is used to access a network, which nodes of a network are accessed, the amount of data sent or received by the network, times of network usage, which nodes of the network are interacted with and the corresponding locations of the nodes, connection speeds, signal strength, error rates, dropped packets, communication protocols, signing in or out of a network, other indicia of connection quality, etc. The collected data can include aggregate information, including network quality data about network connection quality for the user who reported the network problem and for other users. The aggregate information can include, for example, network quality data for a first user who reported the problem, network quality data for other users who connect to a same node as the first user, and network quality data for other users who connect to neighboring nodes or nodes that are 1 or 2 nodes away (or other distance quantity or distance type) in the network.

At block 119, the work orders can be executed according to the priority order determined in block 115. A system can cause the work orders to be executed, for example, by assigning or instructing a technician to execute a work order.

At block 121, aggregate network quality data can be collected after the work orders are executed in block 119. This can include, for example, which devices are used by users to access a network, what software is used to access a network, which nodes of a network are accessed, the amount of data sent or received by the network, times of network usage, which nodes of the network are interacted with and the corresponding locations of the nodes, connection speeds, signal strength, error rates, dropped packets, communication protocols, signing in or out of a network, other indicia of connection quality, etc. The collected data can include aggregate information, including network quality data for the user who reported the network problem and for other users. The aggregate information can include, for example, network quality data for a first user who reported the problem, network quality data for other users who connect to a same node as the first user, and network quality data for other users who connect to neighboring nodes or nodes that are 1 or 2 nodes away (or other distance quantity or distance type) in the network.

In some embodiments, a single data collection process can be used to continually collect the data for block 103, block 117, and block 121.

At block 123, a user interface can be generated to present a before and after comparison of the network quality metrics based on the data from block 117 and from block 121. The presented data can include information about the network connection quality for the specific user who reported the problem in block 107, about the network connection quality for one or more nodes affected by the reported problem such that connection data about a plurality of users (including the specific user who reported the problem in block 107) is included, and/or about the network connection quality data for other groups of users that do not necessarily include the specific user who reported the problem in block 107 (such as connection quality data for neighboring nodes). Example user interfaces are shown in FIG. 4, FIG. 5, FIG. 6, and FIG. 8. In some embodiments, a before and after analysis report, such as shown in the FIG. 4, FIG. 5, FIG. 6, and FIG. 8, can be automatically generated in response to the completion of each work order and communicated to a technician or other network administrator.

Figure 5:
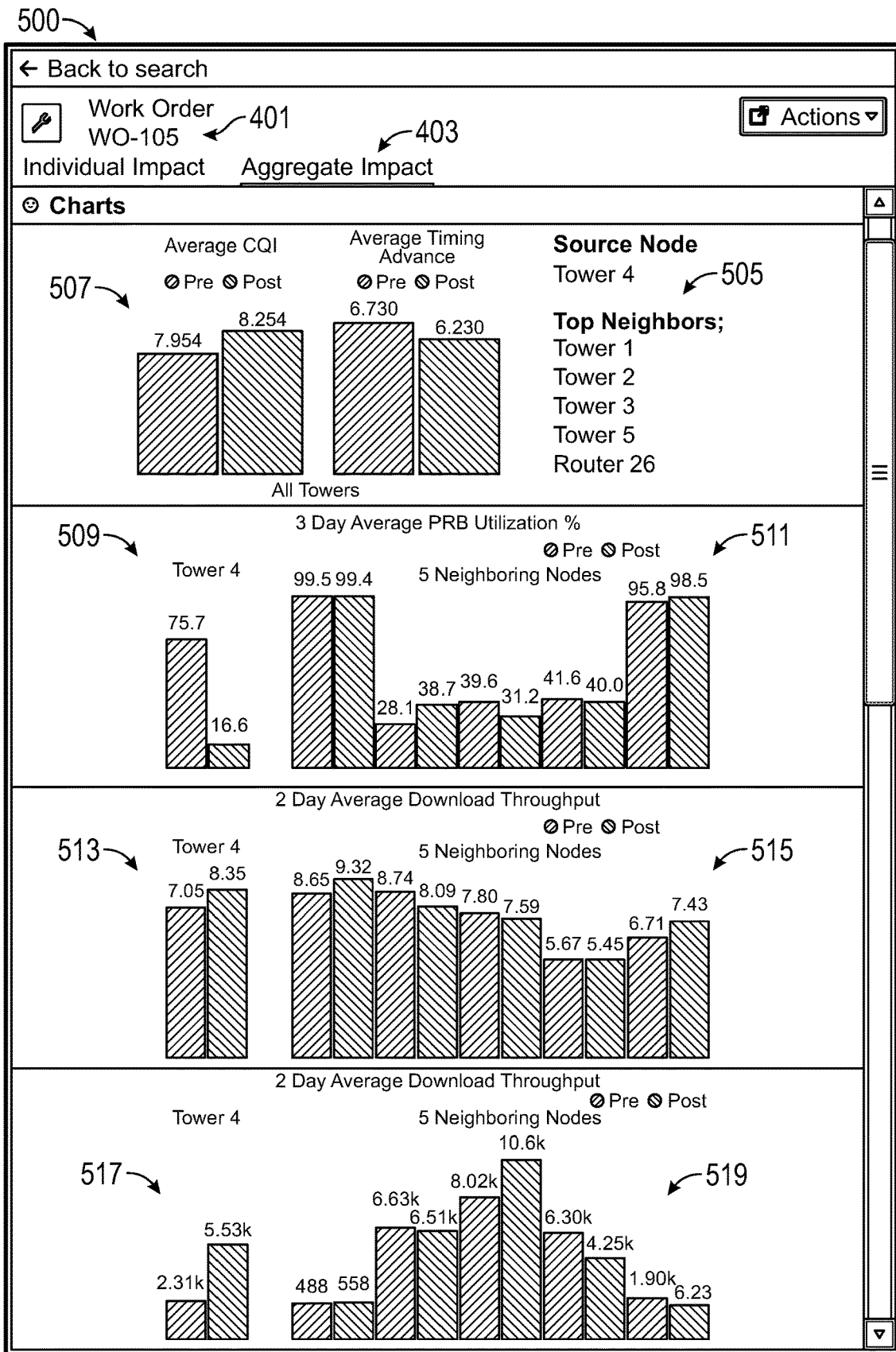
FIG. 5 shows an example user interface showing aggregate analysis of a work order.
Figure 6:
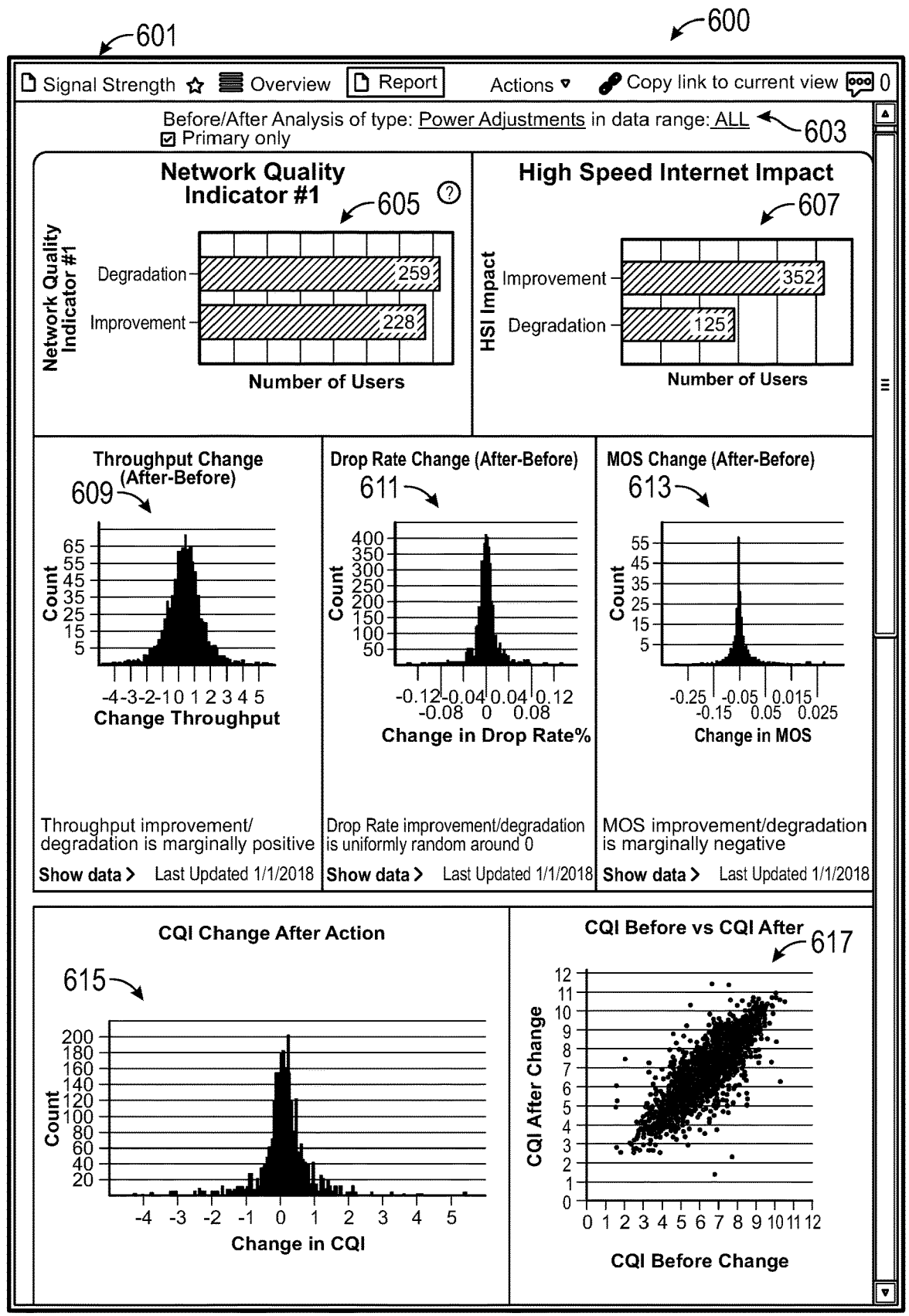
FIG. 6 shows an example user interface for viewing the aggregate effects of executing work orders in response to problems.
Figure 8:
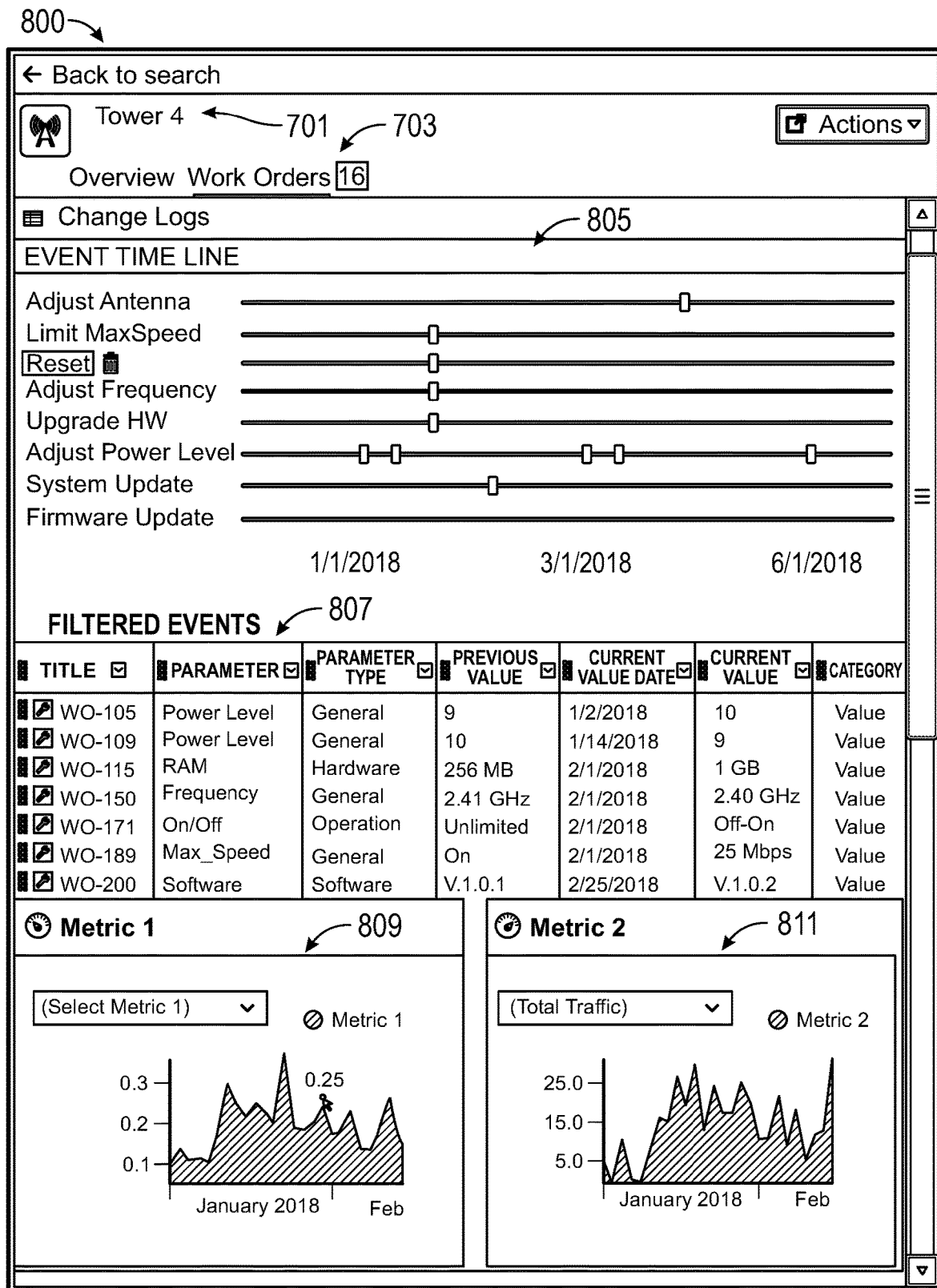
FIG. 8 shows an example user interface for displaying a history of work orders for a featured node.

At block 125, the aggregate effects of work orders can be analyzed or evaluated. It may be expected that if a user complained about a network problem (e.g., a slow speed), a technician implemented a fix for the network problem, and the user confirms that the problem is fixed, then the overall network connection quality should improve due to fixing the problem for the user (and also due to probably fixing the same problem for other users). However, in practice, a counter-intuitive result can occur: fixing the network problem for one user can often decrease the network connection quality for a plurality of other users, causing a decrease in the aggregate network connection quality. This can be caused by a variety of network complexities that may not have been considered in determining which types of work orders to implement for user problems. The analysis of aggregate effects can be presented in a user interface, such as shown in FIG. 5, FIG. 6, and FIG. 8. In some embodiments, a before and after analysis of aggregate effects report, such as shown in FIG. 5, FIG. 6, and FIG. 8, can be automatically generated in response to the completion of a work order and communicated to a technician or other network administrator.

As an example, a first user can call to report a problem about a poor connection to a wireless network when the first user is in a first area of a campus near a first wireless access point. In response, a technician can be assigned a work order to adjust the angle of the antenna of the wireless access point to better focus the wireless signals across the first area. The first user may then confirm that the problem is fixed. However, by adjusting the angle of the antenna, the wireless access point may drop coverage of a second area of the campus. Users in the second areas may instead connect to a second wireless access point. By picking up more connections, the second wireless access point may be overloaded during peak hours such that many users connecting through the second wireless access point experience decreased connection speeds. Such effects are not recognized, even when the technician follows up with the first user to confirm if the problem is solved, and the technician lacks the intricate understanding of which other users might be affected by the work order, and the technician would not know which other users to survey to detect the effects of on the second wireless access point.

By analyzing the aggregate effects of work orders on other users and other nodes, a technician, engineer, or other type of network administrator can see the effects of work orders on aggregate network connection quality metrics. Then, the effects of the work orders can be analyzed to better understand the complexities of the network, and the work order can be adjusted or changed so that negative side effects are avoided in the future. For example, instead of adjusting an angle of an antenna of a wireless access point whenever an area covered by the wireless access point has poor reception, the work order can be changed to reduce the signal frequency, or the work order can be changed to only adjust the antenna if other neighboring nodes are not at capacity.

It can be counter-intuitive to analyze the aggregate effects of a local problem. For example, if Alice calls a technician to report a problem with network node 1, the technician may perform a work order to service network node 1 and follow up with Alice to see if the problem is resolved. However, it would be counter-intuitive for the technician to follow up with Bob and Bob's network performance through network node 2. Furthermore, it would be impractical for a technician to, in response to a report from one user, to follow up with all other users about all other network nodes because the workload for doing so would grow by orders of magnitude.

At block 127, the database of network problems and corresponding work orders can be updated based on the analysis in block 125. The corresponding work orders can be changed in order to avoid causing negative side effects on network connection quality. If future user reports are received (e.g., at block 107), then the improved work order can be executed to resolve the problem without causing the negative side effects.

In some embodiments, a flowchart can include blocks 109, 111, 119, and 125, and omit some of the blocks of the flowchart 100. For example, a model can be generated to determine the importance of problems (block 109); a database of problem types can be referenced and strategies to potentially fix those problem types can be identified (block 111); the work order can be executed according to a determined priority and the model (block 119); and the aggregate effects of work order can be analyzed or evaluated (block 125). Moreover, feedback determined at block 125 regarding an evaluation of the effects of the work order can be applied to the model (block 109) and to the database of problem types and potential fixes (block 111).

Example User Interfaces Showing Priority

FIG. 2 shows an example user interface 200 for viewing the information about network problems and priorities for resolving the problems. The user interface 200 includes a column showing an identifier of a user 201, a column of node or hardware identifier 203, a column indicating the importance of the problem to the user 205, a column of known issues 207, a column indicating a first quality metric 209, a column indicating an aggregate impact 211, a column indicating second quality metric 213, and a column indicating an overall priority 215.

The column of user identifiers 201 can indicate the identities of users who reported a problem with a network. Examples of user identifiers include real names, usernames, IMEI numbers of a computing device associated with the user, an MAC address of a computing device associated with the user, an IP address of a computing device associated with the user, or other similar identifier.

The node or hardware identifier 203 indicates a node in the network that the respective user reported a problem about or connects to. The node can be a router, wireless access point, server, cell tower, etc. Sometimes, users may know which network node has a problem. For example, a user can call in to report that the user cannot connect to Router #1. Other times, the node can be determined by referencing network usage data (e.g., such as collected in block 103 of FIG. 1). For example, if a user calls in to report problems connecting to a network at work, it can be identified from the network usage data that the user is frequently connected Router #2 on weekdays from 9 am to 5 pm, and that Router #2 is located by the user's work address. In various embodiments, the node can be identified by a MAC address, IP address, name, number, or other identifier.

The importance of the problem to the user 205 can be determined using the model (e.g., the problem importance model from block 109 of FIG. 1). In the example user interface 200, the importance is assigned a value of high, medium, or low, but in other examples, the importance can be assigned a numerical score or other type of value.

The column of known issues 207 can indicate the type of problem that is known, whether from the user's report or from the report of other users. In some cases, the user listed in the column of user identifiers 201 may report a problem, which can be saved in a database and displayed in the column of known issues 207. In some cases, other users may have previously reported problems with network connections (such as problems related to Router 1). When user ABC123 reports a problem, the known issue can be determined from diagnosing or troubleshooting the previously reported problems.

The column of the first quality metric 209 and the column of a second quality metric 213 can indicate different quality metrics. Some metrics can indicate a quality metric for the node in column 203. For example, quality metrics can include a number of connected users, a throughput, a connection speed for uploads or downloads, a connection quality, ping times, packet loss, coverage area, dropped connections, MOS, CQI, congestion, latency, or any other network quality metric. The network quality metrics 209, 213 can be filtered, such as to include only data from weekday business hours, from peak times, from primary users who connect to the node for at least 30 minutes per day (e.g., as opposed to transient connections), and the like.

The column of aggregate impact 211 indicates how many other users may be affected by the known issue 207. This can be determined, for example, by referencing the network usage data (e.g., from block 103 of FIG. 1) to count a number of other users whose network connections include the respective network node. In some embodiments, the column indicating aggregate impact 211 (or a separate column) can account for the importance of the problem to the other users as determined by the model based on the demographics of the other users. For example, according to the first row, the uplink constrained data speeds affecting Router 1 affects a significant number of other users, while the 14$^{th}$ row of the table indicates that a minimum number of other users are affected by the high latency reported for Server 2.

The column of the overall priority score 215 indicates which problems should be addressed before other problems in order to meaningfully improve the network quality for a largest number of people. The overall priority score can be based at least in part on the importance of the problem to the user who reported the problem as determined by the importance model, the number of other affected users, and the importance of the problem to the other affected users as determined by the importance model.

FIG. 3 shows an example user interface 300 for viewing priorities of work orders. The user interface 300 includes a filter 301, a sort menu 303, a column of work order identifiers 305, a column indicating the identified problems 307, a column indicating identified solutions 309, a column indicating numbers of users affected by the problem 311, a column indicating numbers of users highly impacted by the problem 313 as determined by the importance model, a column identifying a hardware or nodes to be worked on 315, and a column assigning a priority to the work order 317.

The filter 301 can be used to filter the table of work orders based on various criteria, such as for selected types of problems, selected nodes, problems affecting certain numbers of users, etc. The sort menu 303 can be used to sort the table of work orders.

Each row of the table includes a work order identifier 305 identifies a work order along with the problem 307 to be solved by an identified solution 309 according to the database. Each work order is assigned a priority 317 based on how many users are affected 311 and/or highly impacted by the problem. To effectively allocate time and human resources, technicians can be instructed to perform the word orders according to the priority.

The priority 317 can be based on the number of affected users 311. The number of affected users can be determined, for example, by referencing the network usage data (e.g., as discussed with respect to block 103) to determine a number of users who connect through each respective network node 315. The count can be filtered, such as to include only data from weekday business hours, from peak times, from primary users who connect to the node for at least 30 minutes per day (e.g., as opposed to transient connections), and the like.

The priority 317 can additionally or alternatively be based on the number of highly impacted users 313. The number of highly impacted users can be determined, for example, by applying the demographics of the affected users to the importance model (e.g., the model from block 109 of FIG. 1). Using the model, an importance of the problem can be determined for each affected user (even the ones who did not report the problem), and the number of users with an importance score above a certain threshold can be included in the number of highly impacted users 313.

Each element shown in FIG. 2 and FIG. 3 can be interacted with to provide additional details. For example, interacting with a user ID can provide more details about the user, bring up contact information for the user, display network usage by the user, etc. Interacting with a work order can bring up a user interface showing when the work order was executed or is scheduled to be executed, what technical work the work order includes, what hardware the work order will affect, etc.

The user interface of FIG. 3 can be used by technicians to prioritize work orders. For example, a technician may sort the work orders by priority and perform the highest priority work order to provide the greatest benefit to the network quality. Or, for example, a technician who has traveled to a network node can use the filter 301 to find work orders related to the network node, and the technician can execute those work orders according to the order of priority.

The techniques disclosed herein can be applied to troubleshooting, fixing, upgrading, modifying, or improving a variety of systems, and is not necessarily limited to communication networks. For example, the techniques can apply to troubleshooting components of a computer system, an electrical system, or components of mechanical devices such as cars. The techniques can be applied to any system where work orders are generated to fix, repair, upgrade, or otherwise change or modify components or settings of a complex system with interconnected components. As another example, the techniques can be applied to the improvement of generating invoices in a wholly or partially automated manner. Feedback regarding the invoices (such as an entity reporting issues with an invoice or other feedback) can be used by a system to evaluate and improve an invoice system. For any respective system, the appropriate metrics can be collected for each component in the system. For any of the user interfaces disclosed herein, features may be shared with other user interfaces, displayed simultaneously, or separated from other user interfaces.

In the context of troubleshooting or improving systems that are not necessarily limited to communication networks, the blocks 109, 111, 119, and 125 can be used in such contexts. As mentioned above, a model can be generated to determine the importance of problems in the particular context (block 109); a database of problem types can be referenced and strategies to potentially fix those problem types can be identified in that context (block 111); the work order (or improvement) can be executed according to a determined priority and the model in that context (block 119); and the aggregate effects of work order (or improvement) can be analyzed or evaluated in that context (block 125). Also as mentioned above, feedback determined at block 125 regarding an evaluation of the effects of the work order (or improvement) can be applied to the model (block 109) and to the database of problem types and potential fixes (block 111).

Example User Interfaces Showing Before and After Analysis

A completed work order can be selected from a user interface (such as user interfaces 200 or 300) to bring up details about the work order and also to display a before/after analysis user interface of the work order.

FIG. 4 shows an example analysis interface 400 for a completed work order. The user interface 400 includes a work order identifier 401, a menu 403, before and after dates 405, details 407 about the work order, location details 409 about the node, a map 411 of the location of the node, a first set of before and after graphs 413 of network quality metrics, a second set of before and after graphs 415 of network quality metrics, and a third set of before and after graphs of network quality metrics.

The menu 403 can be selected to show user interface 400 with information about the effects of a work order on a single node, or user interface 500 (discussed below with respect to FIG. 5) to show the effects of a work order on a plurality of nodes.

The Pre Date and the Post Date (also referred to as before and after) 405 indicate dates of collecting data (e.g., at block 117 and block 121 of FIG. 1). The Pre Date indicates the date for which network quality data was collected before a work order. The Post Date indicates the date for which network quality data was collected after the work order was executed. In some cases, the dates can span longer than one day to allow for a larger data set of information to be collected. The dates can also be non-consecutive to account for the effects of weekends or holidays. For example, if the Pre Date is on a Thursday, and the work order was performed on a Friday, then the Post Date can be the next Thursday to ensure that the effects of the work order are reflected by the network quality data instead of differences in user behavior caused by different days of the week.

The details menu 407 shows details about the work order 401 that was performed. The example details menu 407 shows that Tower 4 had a signal strength problem, so the power of Tower 4 was adjusted up to 10 on Jan. 2, 2018 as part of the work order by the technician Bob. The details menu can also include additional statistics for the node 401.

The sets of graphs 413, 415, and 417 can show comparisons of network quality metrics collected before and after the work order execution. The graphs can be generated based on the data collected at block 117 and block 121 of FIG. 1.

The set of graphs 413 indicate percentages of users who have a network connection through the node 401 on the before and after days 405. The first pair of bar graphs shows before and after comparisons of users with dropped calls. The percentage of dropped calls was reduced to almost half the initial value after the work order was completed, which suggests that the work order was effective. The second pair of bar graphs shows before that the percentage of users experiencing a MOS score of less than 3.5 increased slightly. The third pair of bar graphs shows that the percentage of users who experience throughput of less than 0.5 Mbps significantly decreased from about 31% to about 10%, suggesting that the about 21% of the users saw improved network throughput after the work order was executed.

The pair of graphs 415 show before and after comparisons of other network quality metrics, such as average CQI and average timing advance, which is an indicator of distance. The graphs show that the average CQI increased and that the average timing advance decreased after the work order was executed.

A user can select an option to display the graphical analysis of the network connection quality data for users satisfying certain criteria. For example, the box is checked to only analyze the data of users for which the network node 401 is a primary connection point. This can affect the analysis because the quality of primary connections can be more important to users. For example, a user may consider it important to have a good network connection at work and at home, but the user may consider it less important to have a good network connection while driving along the highway between work and home. Accordingly, various criteria can be entered to define a primary node or primary user. Analysis in other user interfaces shown in other figures can similarly include options to analyze only primary nodes or primary users.

The before and after analysis graphs of network quality indicators can then be generated for the users who satisfy the criteria of having Tower 4 as a primary node. The bar graphs 417 show minor differences in the effect of the work order on the number of dropped calls and throughput. However, for the users with Tower 4 as a primary node, the MOS score improved. Accordingly, the graphs suggest that although increasing the power of Tower 4 may have slightly reduced the MOS score for general users, the power increase improved the MOS score for the users who care the most about and use Tower 4 the most.

A variety of other graphs can additionally be shown. The graphs can be shown for 3 day averages, weekday averages, weekend averages, for users of certain demographics, etc.

Example User Interfaces for Aggregate Analysis

FIG. 5 shows an example user interface 500 showing aggregate analysis of a work order. From the user interface 400 of FIG. 4, the user interface 500 of FIG. 5 can be displayed in response to selecting the "Aggregate Impact" tab. The user interface 500 includes a list of neighboring network nodes 505, a first set of bar graphs 507 displaying aggregate network quality metric data for all towers, a second set of bar graphs 509 indicating PRB (physical resource block) utilization 509 for Tower 4, a third set of bar graphs 511 indicating PRB utilization for neighboring nodes, a fourth set of bar graphs 513 indicating average download throughput for Tower 4, a fifth set of bar graphs 515 indicating average download throughput for the neighboring nodes, a sixth set of bar graphs 517 indicating average traffic for Tower 4, and a seventh set of bar graphs 519 indicating average traffic for the neighboring nodes.

The aggregate impact can show the effect of the work order 401 on other nodes besides the node that was changed as part of the work order 401. The aggregate data can be collected before and after the work order is executed (e.g., at block 117 and block 121 of FIG. 1). By analyzing the effects of a change to a network node on the network connection quality of other network nodes, the aggregate effects of a work order can be recognized without understanding all of the complexities of a network. The graphs in the user interface 500 and the user interface 400 can be interacted with, such as by selecting or hovering over, to display additional information about the underlying data or network node.

The list of neighboring network nodes 505 can identify one or more neighboring nodes in a communication network. The neighboring nodes can be of a same type of node (e.g., all towers) as the node that was changed as part of the work order 401, or the neighboring nodes can include different types of nodes (such as routers, servers, etc.). The neighboring nodes can be network nodes that are a closest distance to the node that was changed as part of the work order 401. The distance can be a physical distance (e.g., in miles), nodes that communicate with the node that was changed as part of the work order 401 via a smallest number of intermediary nodes, or other similar criteria.

The first set of bar graphs 507 displays aggregate network quality metric data for all towers in the network before and after the work order 401 was completed. The graphs show that the average CQI of all towers increased from about 7.95 to about 8.25, and the average timing advance decreased from about 6.73 to about 6.23. A user can interact with the user interface 500 to select different types of nodes (such as to select all routers) and to select different network quality metrics (such as speed).

The second set of bar graphs 509 indicates 3 day average PRB (physical resource block) utilizations 509 for Tower 4 before and after the work order 401 was completed. The bar graphs show that the 3 day average PRB utilization (an indicator of congestion) for Tower 4 dropped from about 75 to about 16.

The third set of bar graphs 511 indicates 3 day average PRB utilizations for the neighboring nodes 505 before and after the work order 401 was completed. Each pair of bar graphs in the set of bar graphs 511 shows the before and after effects of the work order on one of the neighboring nodes. As the graphs show, some of the neighboring nodes experienced increases in average PRB utilization while others experienced declines in average PRB utilization.

The fourth set of bar graphs 513 indicates 2 day average download throughputs for Tower 4 before and after the work order 401 was completed. The bar graphs show that the average download throughput improved for Tower 4 after the work order was completed.

The fifth set of bar graphs 515 indicates 2 day average download throughputs for the neighboring nodes 505 before and after the work order 501 was completed. Each pair of bar graphs in the set of bar graphs 515 shows the before and after effects of the work order on one of the neighboring nodes. As the graphs show, two of the neighboring nodes experienced decreases in average download throughput, two of the neighboring nodes experienced increases in average download throughput, and one of the neighboring nodes was relatively unaffected by the work order.

The sixth set of bar graphs 517 indicates 3 day average traffic for Tower 4 before and after the work order 401 was completed. The bar graphs show that the average traffic doubled for the Tower 4.

The seventh set of bar graphs 519 indicates 3 day average traffic for the neighboring nodes 505 before and after the work order 401 was completed. Each pair of bar graphs in the set of bar graphs 519 shows the before and after effects of the work order on one of the neighboring nodes. As the graphs show, the neighboring network nodes experienced different changes in 3 day average traffic after the work order 401 was completed.

By presenting the graphs of aggregate analysis of the neighboring nodes, the unrecognized effects of a work order on neighboring network nodes can be recognized and investigated. For example, as shown by graphs 513 and 515, although the work order improved the 2 day average throughput for Tower 4, some other neighboring nodes experienced decreases in throughput, including Tower 3, which had increased traffic during that time. Accordingly, the effects of performing the work order 401 to increase the power of Tower 4 may have negatively affected Tower 3, such as by causing interference with or by diverting power away from Tower 3.

FIG. 6 shows a user interface 600 for viewing the aggregate effects of executing work orders in response to problems. The user interface 600 includes a problem type indicator 601, a filter menu 603, a first graph 605, a second graph 607, a third histogram 609, a fourth histogram 611, a fifth histogram 613, a sixth histogram 615, and a seventh scatterplot 617. The data for generating the graphs and histograms can be collected, for example, at block 117 and block 121 of FIG. 1. The user interface 600 can be a useful tool for technicians and engineers to assess whether or not a database of network problems and corresponding work orders or troubleshooting manual is proscribing, for a particular problem, a solution that improves the overall network quality.

The problem type indicator 601 can be used to filter for data related to certain types of problems reported by network users or for all types of problems. For example, users may report slow speeds, bad signal quality, dropped connections, etc. The filter menu 603 can be used to filter the data and generate the graphs and histograms based on additional or alternative criteria, including types of work orders performed (such as adjusting power, resetting hardware, updating software, upgrading memory, changing frequencies, etc.) and date ranges (such as all dates, after a date of a latest revision to the database of network problems and corresponding work orders, for data including 3-day averages, for weekdays only, for peak times only, etc.). Each of the graphs and histograms 605-617 can show the before and after effects of performing a type of work order in response to a type of reported problem within a date range or other filter criteria on an overall network. In some embodiments, the filter can be further limited to include data from a node on which the work order was performed, limited to a number of neighboring nodes instead of the whole network, and/or limited to primary users or primary nodes.

The first bar graph 605 shows the before and after impact of performing power adjustments on a first indicator of network quality specific to users, such as signal strength. The first bar graph 605 indicates that after historical power adjustments were made in response to reported signal strength problems, on average 259 users experienced a lower quality of network connection based on the first indicator as compared to before the power adjustments were made, while on average 228 users experienced better signal strength. Such data can be used to conclude, for example, that whenever a first user called to report a problem with signal strength, a technician may have adjusted the power level of a network node to improve the first user's signal strength (and the signal strength of 227 others) until the first user was satisfied, but that by doing so, the signal strength on average decreased for about 259 other users. Accordingly, making a power adjustment in response to complaints about signal strength decreases the network quality for users overall. The aggregate data can be displayed with respect to effects on users or with respect to a number of times that a network improved or degraded whenever a work order was performed.

The second bar graph 607 shows the before and after impact of performing power adjustments on a second indicator of network quality, such as whether users saw an improvement or degradation of high speed internet service. The metric can count, for example, users who experience at least a threshold increase or decrease to internet speeds after a power adjustment was performed. The second bar graph 607 shows that on average, the high speed internet was improved for about 352 users while about 125 users had their high speed internet degraded each time. Accordingly, making power adjustments improves the aggregate high speed internet quality for the network.

The third histogram 609 shows the before and after impact of performing power adjustments on a third indicator of network quality, such as throughput. The x-axis indicates a change in throughput, where positive numbers indicate increases in overall network throughput, and the y-axis indicates a number of times the network experienced the respective degree of change in throughput after the work order was performed. Overall, the change in throughput is marginally positive whenever a power adjustment is performed.

The fourth histogram 611 shows the before and after impact of performing power adjustments on a fourth indicator of network quality, such as a rate of dropped calls or connections. The x-axis indicates a percent change in drop rates, where positive percentages indicate more dropped calls or connections, and the y-axis indicates an average number of users who experienced the respective degree of change in dropped calls or connections after the work order was performed. Overall, the change in dropped calls or connections is approximately evenly distributed around zero.

The fifth histogram 613 shows the before and after impact of performing power adjustments on a fifth indicator of network quality, such as a MOS. The x-axis indicates a change in MOS, and the y-axis indicates an average number of times network changed by the respective amount of MOS after the work order was performed. Overall, the change in MOS is marginally negative.

The sixth histogram 615 and the seventh scatterplot 617 show the before and after impact of performing power adjustments on a sixth indicator of network quality, such as a CQI. On histogram 615, the x-axis indicates a change in CQI, and the y-axis indicates an average number of times that the network changed by the respective amount of CQI after the work order was performed. On the scatterplot 617, the x-axis indicates a CQI of the network before the work order, and the y-axis indicates the CQI of the network after the work order. Overall, the histogram 615 shows that the changes in CQI are centered around zero, and the scatterplot shows that generally the CQI after the work order is strongly correlated to the initial CQI with a 1:1 relationship.

The aggregate analysis data presented in the user interface 600 indicates that changing a power level of a node in response to a user complaint about signal strength is generally ineffective at improving the overall quality of the network. Some network quality indicators, such as network quality indicator #1, are negative. The histograms 609, 611, 613, and 615 are close to being centered around 0. If the network quality were improved each time that the work order was performed, then it would be expected that the network quality indicators would be centered about a positive number indicating positive changes to a network quality metric. Similarly, the scatterplot 617 indicates that the CQI is strongly related to the initial CQI and has equal chances of experiencing a positive or negative change. If the network quality were improved each time that the work order was performed, it would be expected that the CQI after the work orders would be higher (e.g., the scatterplot 617 would be shifted up, be a relatively flat line across high CQI numbers, or be generally contained in the top left corner of the graph instead of as currently shown in FIG. 6).

In some cases, vast amounts of resources are expended by network support teams to respond to user reported problems. The response technicians are assigned to perform certain work orders (such as adjusting a power level of a network node) whenever certain types of problems are reported. Often times, despite the best efforts of the smartest scientists and engineers, the planned problem-work order pairs have only about a 50/50 chance of improving the overall network quality, such as shown by the histograms, and the scientists and engineers may remain blind to this effect.

The user interface 600 allows for interaction and investigation. For example, a user can mouse over or click on one of the bars of the graphs 605, 507 or histograms 609, 611, 613, 615 or dot in the scatterplot 617 to bring up more details about the underlying data, including which network nodes had the work order 603 performed in response to the problem 601. Then, those details can be examined to determine, for example, if the network quality improved for the individual node (such as by using the user interface 400 of FIG. 4) and/or the neighboring nodes (such as by using the user interface 500 of FIG. 5).

Based on the information presented in the user interface 600 and/or subsequent investigation, the database of network problems and corresponding work orders can be adjusted or refined (e.g., at block 127 of FIG. 1). For example, based on the data presented in graph 607, a new database entry could be added to increase the power of network nodes if a user reports slow internet connection speeds. As another example, the database can be refined to indicate that if a user reports a signal strength problem, then the power should be adjusted as a secondary solution after adjusting a different parameter first (such as a frequency channel), or that the power level should be adjusted after determining that other neighboring nodes are under capacity. After the database of network problems and corresponding work orders are adjusted, whenever subsequent problems are reported by users (e.g., at block 107 of FIG. 1), a new work order can implement a revised solution that better improves the aggregate network quality.

Example User Interfaces for Network Nodes

FIG. 7 shows an example user interface 700 presenting details about a network node. The user interface 700 can be displayed, for example, in response to a user interaction with a specific node (such as clicking the node 409 in FIG. 4 or node 315 in FIG. 3 or node 203 in FIG. 2). The user interface 700 includes an identifier of the featured network node 701, a menu 703, details 705 about the network node, linked interfaces 707, user distribution data 711, and a table 713 of user data.

The details 705 about the network node can include information such as a location, an IP address, hardware identifiers, software information, a number of users connected to the node, etc.

The linked interfaces 707 can include interactive elements. Linked interfaces can include neighboring network nodes of the featured node 701, technical documents for the featured network node 701, code running on the featured network node 701, and work orders related to the featured network node 701. Interacting with the listed neighboring network nodes can cause another user interface (e.g., similar to user interface 700) to be displayed for the neighboring network node. Interacting with the document or software can cause the document or software to be displayed. Interacting with the work orders can cause a history of the work orders for the featured node 701 to be displayed (for example as shown in FIG. 8 and described below).

The user distribution data 711 can display data about the users connected to the network through the featured network node 701. The data can include a histogram or other count indicating, among the users connected to the network through the featured node 701, how many users are or may experience important network quality problems. The importance of network quality problems can be determined, for example, using the model (e.g., the importance model described with respect to block 109 of FIG. 1). The importance can be "high" if, for example, a first user reported a problem and is connected through the featured node and the reported problem is deemed important according to the model. The importance can also be "high" for a second user if, for example, a first user reported a problem related to the featured node, and the model indicates that based on the second user's demographics and network connectivity through the featured network node 701, the problem is important to the second user.

The table 713 includes data about the users connected to the network through the featured network node 701. The data may present information including identifiers of the users, demographic information about the users, a time of a last activity between the user and the featured node 701, an amount of data communicated between the user and the featured node 701, a time duration of connectivity between the user and the featured node 701, hardware used to connect to the network through the featured node 701, whether the featured node 701 is a primary node for the user, upload speeds, download speeds, latency, packet loss, protocol, CQI, MOS, or any other data about the user or the connectivity between the user and the featured node 701.

FIG. 8 shows an example user interface 800 for displaying a history of work orders for a featured node 701. The user interface 800 includes a timeline of work orders 805, a table of work orders details 807, and metric trackers 809 and 811. User interface 800 can be displayed, for example, by interacting with the "Word Orders" tab in the menu 703 of user interface 700 of FIG. 7.

The x-axis of the timeline 805 indicates a progression of time. The y-axis of the timeline 805 indicates different types of work orders that were performed on the featured node 701.

The table 807 provides details about each work order shown in the timeline 805. The table 807 includes an identifier of the work order, a parameter adjusted during the work order, a type of parameter adjusted during the work order, a previous value for the parameter adjusted during the work order, a date that the parameter was adjusted, a new value for the adjusted parameter, and other categories of details about the work order.

The user interface 800 showing the history of work orders can provide valuable insight into how a network node has been changed as part of the analysis of aggregate effects. For example, as shown by the timeline 805 and the detailed table 807, the power level was adjusted back and forth between 9 and 10 in early January and was subsequently adjusted in March and June. This may happen, for example, if a first user reports a problem that is solved by adjusting the power level to 10 but causes a problem for a second user who calls to have the new problem solved by adjusting the power level back to 9. Accordingly, the user interface 800 allows for recognition of previous attempts to solve problems and realization that, for example, if a user calls to report a problem that a database recommends responding to by adjusting a power level, then adjusting the power level may create additional problems for different users.

The metrics can be displayed as graphs 809, 811, tables, or in any other format. The metrics can be selected from a menu and displayed with respect to time or with respect to changes in other metrics. Example metrics for a node can include total traffic, bandwidth, time at capacity, dropped calls or connections, spare capacity, throughput, number of users, etc. When displayed with respect to time, the metrics can be compared to work orders to determine the effect of work orders on the metric.

Example Network System

Figure 9:
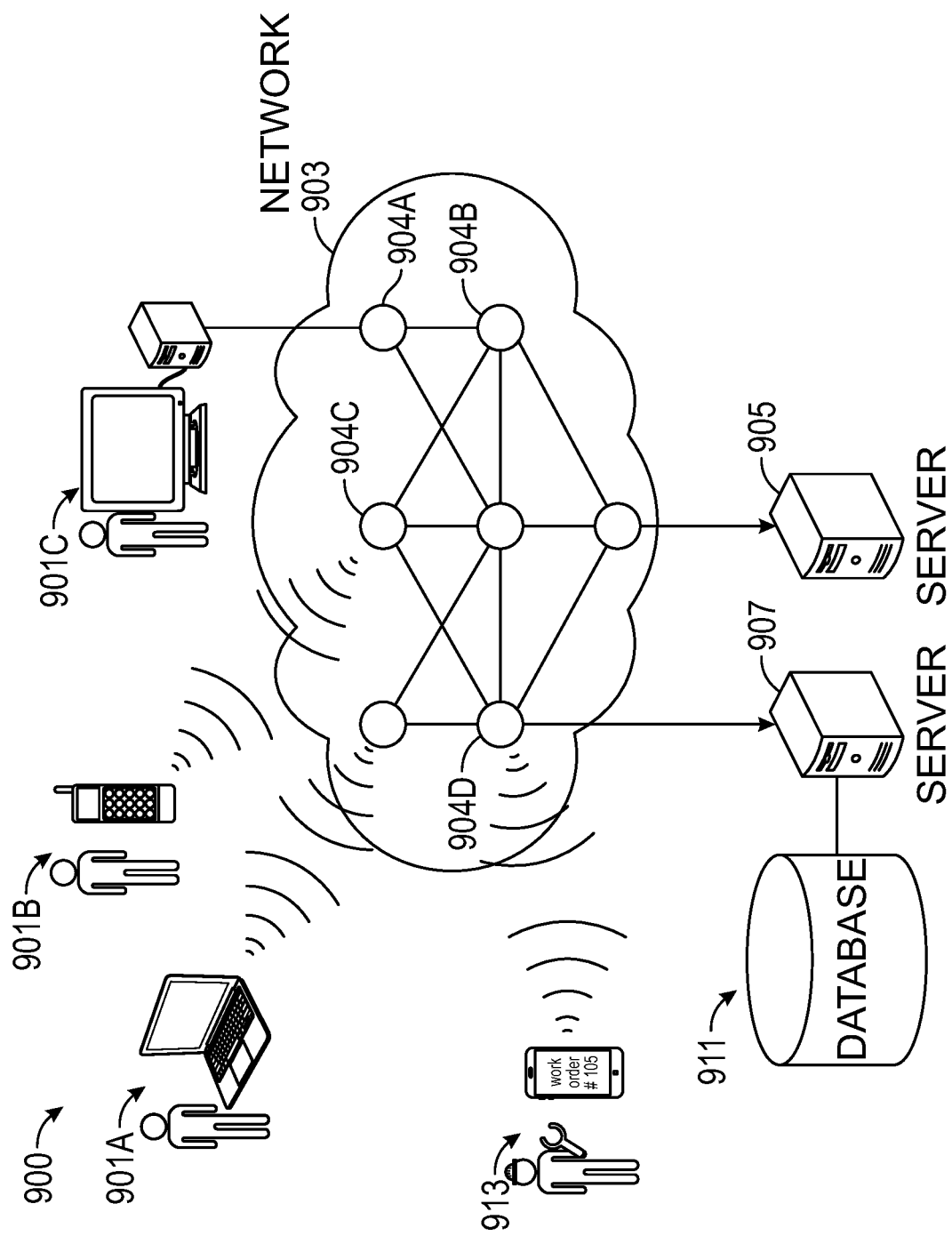
FIG. 9 shows an example network system.

FIG. 9 shows an example network system 900. A plurality of users 901A-901C connect to the network 903 using various computer devices such as laptops, smartphones, computers, tablets, internet of things devices, etc. The users 901 may connect using wired or wireless connections through any of the various nodes 904A-904D of the network, for example, to communicate with each other or with another computer device, such as server 905. The nodes 904A-904D of a communications network can include, for example, routers, cell towers, repeaters, firewalls, wireless access points, switches, etc.

A server 907 can monitor or receive various metrics about network usage and performance, including the usage and performance of nodes, such as described with respect to block 103, block 107, and block 121 of FIG. 1.

From time to time, the various users 901A-901C may report problems with the network 903. Based on the reported problem, a database 911 of network problems and corresponding work orders can be used to determine a work order to assign to a technician 913. The work order can be communicated to the technician 913, who can perform the work order. Before and after the work order is performed, the server 907 can continue to monitor or receive various metrics about network usage and performance, and then analyze the effects of the work order and analyze the aggregate effects of the work order, such as described with respect to block 123 and block 125 of FIG. 1.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
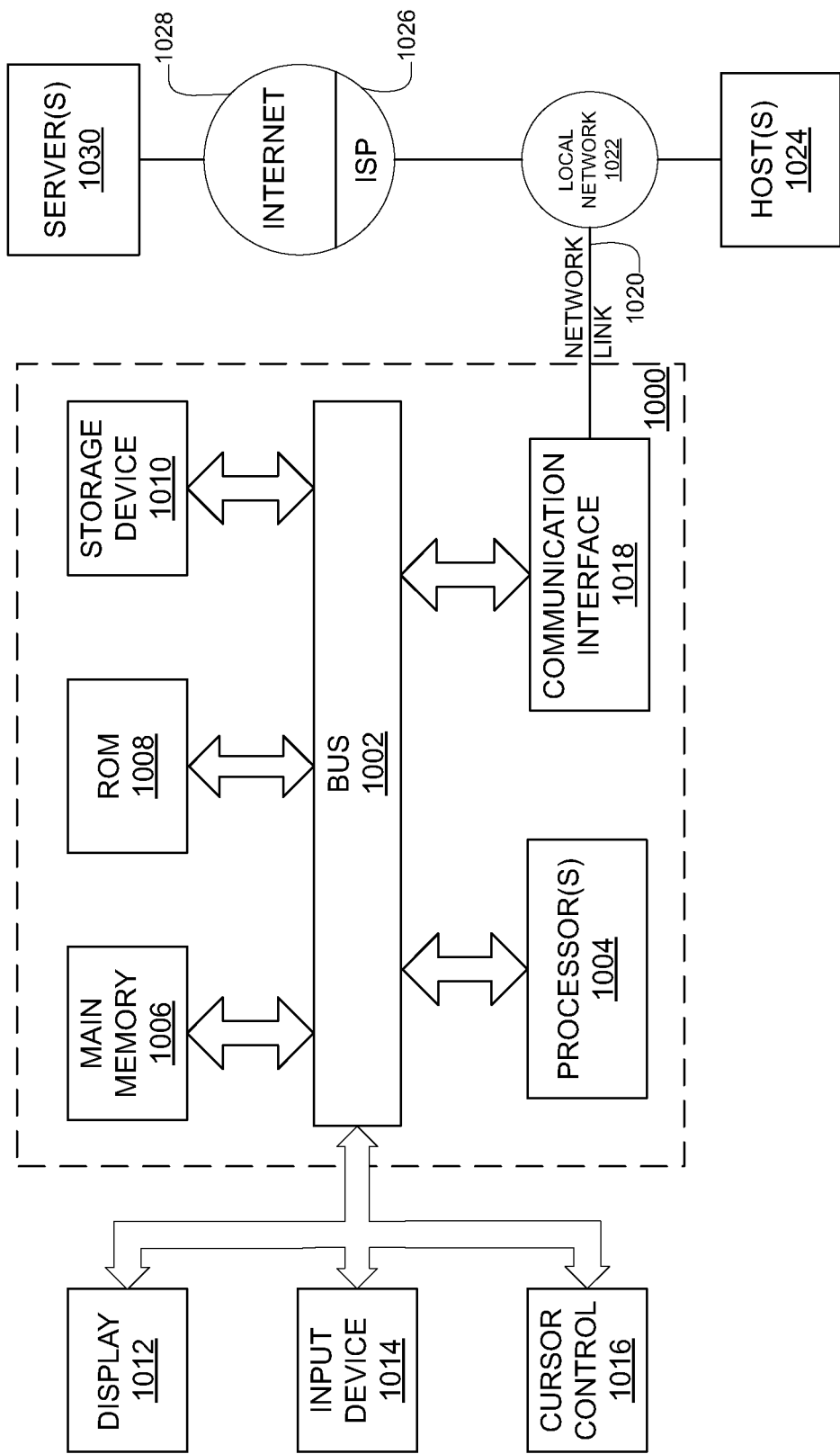
FIG. 10 is a block diagram that illustrates a computer system upon which various embodiments may be implemented.

For example, FIG. 10 is a block diagram that illustrates a computer system 1000 upon which various embodiments may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computer system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

The network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

The computer system 1000 can send messages and receive data, including program code, through the network (s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
one or more computer processors configured to execute computer executable instructions to cause the computer system to:
receive a reported problem about a connection to a network of a first computer device;
determine a node in the network with a connection to the first computer device;
create at least a first work order based on one or more actions to be taken for the node;
determine a quantity of other users associated with the node and thereby potentially impacted by the one or more actions to be taken for the node;
calculate a first priority score based at least in part on the quantity of other users; and
cause the first work order to be executed based at least in part on the first priority score.

2. The computer system of claim 1, wherein the computer executable instructions are further configured to cause the computer system to:
train a model to generate importance scores for aspects of network connections based on at least demographics data for users of the network and network usage data for the users of the network.

3. The computer system of claim 2, wherein the computer executable instructions are further configured to cause the computer system to:
use the model to determine an importance score for the reported problem to a first user of the first computer device; and
assign the first priority score to the first work order based at least in part on the importance score.

4. The computer system of claim 2, wherein the computer executable instructions are further configured to cause the computer system to:
use the model to determine a plurality of importance scores for the reported problem to the other users; and
assign the first priority score to the first work order based at least in part on the plurality of importance scores.

5. The computer system of claim 2, wherein the model is a random forest model configured to assign a higher importance score when input factors are similar to historical variables correlated with network quality.

6. The computer system of claim 2, wherein the model is trained to generate the importance score further based at least in part on network membership data.

7. The computer system of claim 1, wherein the computer executable instructions are further configured to cause the computer system to:
collect first performance metrics for the node before the first work order is executed;
collect second performance metrics for the node after the first work order is executed; and
transmit a report for the node providing a comparison of performance metrics before and after the first work order is executed, wherein the comparison of performance metrics is based at least in part on the first performance metrics and the second performance metrics.

8. The computer system of claim 1, wherein the computer executable instructions are further configured to cause the computer system to:
collect first performance metrics for a second node before the first work order is executed, wherein the second node is a neighboring node to the first node;
collect first performance metrics for a second node after the first work order is executed; and
transmit a report for the second node including a comparison of performance metrics before and after the first work order is executed, wherein the comparison of performance metrics is based at least in part on the first performance metrics and the second performance metrics.

9. The computer system of claim 8, wherein the first work order does not include troubleshooting the second node.

10. The computer system of claim 1, wherein the computer executable instructions are further configured to cause the computer system to:
change the first work order that is assigned in response to the reported problem.

11. A method for troubleshooting networks, the method comprising:
by one or more computer processors executing computer executable instructions:
receiving a reported problem about a connection to a network of a first computer device;
determining a node in the network with a connection to the first computer device;

creating at least a first work order based on one or more actions to be taken for the node;

determining a quantity of other users associated with the node and thereby potentially impacted by the one or more actions to be taken for the node;

calculating a first priority score based at least in part on the quantity of other users; and causing the first work order to be executed based at least in part on the first priority score.

12. The method of claim 11, further comprising:
by the one or more computer processors executing computer executable instructions:
training a model to generate importance scores for aspects of users' network connections based on at least demographics data for users of the network and network usage data for the users of the network.

13. The method of claim 12, further comprising:
by the one or more computer processors executing computer executable instructions:
using the model to determine an importance score for the reported problem to the first user; and
assigning the first priority score to the first work order based at least in part on the importance score.

14. The method of claim 12, further comprising:
by the one or more computer processors executing computer executable instructions:
using the model to determine a plurality of importance scores for the reported problem to the other users; and
assigning the first priority score to the first work order based at least in part on the plurality of importance scores.

15. The method of claim 12, wherein the model is a random forest model configured to assign a higher importance score when input factors are similar to historical variables correlated with network quality.

16. The method of claim 12, wherein the model is trained to generate the importance score further based at least in part on network membership data.

17. The method of claim 11, further comprising:
by the one or more computer processors executing computer executable instructions:
collecting first performance metrics for the node before the first work order is executed;
collecting second performance metrics for the node after the first work order is executed; and
transmitting a report for the node providing a comparison of performance metrics before and after the first work order is executed, wherein the comparison of performance metrics is based at least in part on the first performance metrics and the second performance metrics.

18. The method of claim 11, further comprising:
by the one or more computer processors executing computer executable instructions:
collecting first performance metrics for a second node before the first work order is executed, wherein the second node is a neighboring node to the first node;
collecting first performance metrics for a second node after the first work order is executed; and
transmitting a report for the second node including a comparison of performance metrics before and after the first work order is executed, wherein the comparison of performance metrics is based at least in part on the first performance metrics and the second performance metrics.

19. The method of claim 18, wherein the first work order does not include troubleshooting the second node.

20. The method of claim 11, further comprising:
by the one or more computer processors executing computer executable instructions:
changing the first work order that is assigned in response to and the reported problem.

* * * * *